(12) United States Patent
Wilson et al.

(10) Patent No.: US 11,098,578 B2
(45) Date of Patent: Aug. 24, 2021

(54) QUALITY FACTORS FOR APPRAISING RESISTIVITY LWD INVERSION PERFORMANCE

(71) Applicant: HALLIBURTON ENERGY SERVICES, INC., Houston, TX (US)

(72) Inventors: Glenn A. Wilson, Singapore (SG); Burkay Donderici, Houston, TX (US); Rencheng Song, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 379 days.

(21) Appl. No.: 15/749,754

(22) PCT Filed: Sep. 30, 2016

(86) PCT No.: PCT/US2016/054967
§ 371 (c)(1),
(2) Date: Feb. 1, 2018

(87) PCT Pub. No.: WO2018/063387
PCT Pub. Date: Apr. 5, 2018

(65) Prior Publication Data
US 2019/0017370 A1    Jan. 17, 2019

(51) Int. Cl.
E21B 47/12 (2012.01)
G01V 99/00 (2009.01)
(Continued)

(52) U.S. Cl.
CPC ........... E21B 47/12 (2013.01); G01V 3/30 (2013.01); G01V 3/34 (2013.01); G01V 3/38 (2013.01); G01V 99/00 (2013.01); G01V 99/005 (2013.01)

(58) Field of Classification Search
CPC . G01V 3/38; G01V 11/00; G01V 3/30; G01V 3/34; G01V 99/00; G01V 99/005; E21B 47/002; E21B 47/12
See application file for complete search history.

(56) References Cited

U.S. PATENT DOCUMENTS 8,489,375 B2    7/2013  Omeragic et al.
2013/0046474 A1 2/2013  Bittar et al.
(Continued)

FOREIGN PATENT DOCUMENTS

WO    WO-2015038099 A1 *  3/2015  ............... G01V 3/38
WO    WO2016-089406     *  6/2016  ........... E21B 47/002

OTHER PUBLICATIONS

Dyatlov et al., 2015, Efficient 2.5D electromagnetic modeling using boundary integral equations: Geophysics, vol. 80, No. 3, E163-E173.

(Continued)

Primary Examiner — Regis J Betsch
Assistant Examiner — Kaleria Knox
(74) Attorney, Agent, or Firm — Locke Lord LLP

(57) ABSTRACT

Methods, systems, and computer program products appraise the quality of resistivity LWD data inversion and related earth models. The appraisal uses several quality factors, including signal-to-noise ratio, noise-to-signal ratio, data importance, model parameter importance, and model parameter confidence interval for the resistivity LWD data inversion and related earth models. These quality factors allow a user to determine which data provides useful information, which parts of the earth model may be relied upon, and conversely which parameters in which parts of the model may need to be modified. Such an arrangement is particularly useful in distance-to-bed-boundary (DTBB) inversion for geo-steering and formation evaluation.

20 Claims, 11 Drawing Sheets

(51) Int. Cl.
    *G01V 3/30*     (2006.01)
    *G01V 3/34*     (2006.01)
    *G01V 3/38*     (2006.01)

(56) References Cited

U.S. PATENT DOCUMENTS

| | | | |
|---|---|---|---|
| 2013/0185033 A1* | 7/2013 | Tompkins | G01V 11/00 703/2 |
| 2014/0358503 A1 | 12/2014 | Ciucivara et al. | |
| 2016/0223704 A1* | 8/2016 | Donderici | G01V 3/38 |

OTHER PUBLICATIONS

Jupp et al., 1975, Stable iterative methods for the inversion of geophysical data: Geophysical Journal of the Royal Astronomical Society, 42 (3), 957-976.

Omeragic et al.,, 2009, 3D reservoir characterization and well placement in complex scenarios using azimuthal measurements while drilling: Presented at 50th SPWLA Annual Logging Symposium.

Pardo et al., 2015, Fast 1D inversion of logging-while-drilling resistivity measurements for improved estimation of formation resistivity in high-angle and horizontal wells: Geophysics, vo. 80, No. 2, pp. E111-E124.

Raiche et al., 1985, The joint use of coincident loop transient electromagnetic and Schlumberger sounding to resolve layered structures: Geophysics, tol. 50, No. 10, pp. 1618-1627.

Lee, PCT Written Opinion for PCT Application No. PCT/US2016/054967 dated Jun. 27, 2017.

\* cited by examiner

QUALITY FACTORS FOR APPRAISING RESISTIVITY LWD INVERSION PERFORMANCE

TECHNICAL FIELD

The exemplary embodiments disclosed herein relate generally to quantitative interpretation of resistivity data acquired via logging while drilling (LWD). More specifically, the embodiments disclosed herein relate to systems and methods of appraising the quality of resistivity LWD data inversion and related earth models, particularly distance-to-bed-boundary (DTBB) inversion for geo-steering and formation evaluation.

BACKGROUND

Geo-steering is used in the oil and gas industry to adjust drilling trajectory in horizontal wells. Among other things, the technology uses resistivity LWD data acquired in real time to support trajectory steering decisions. However, resistivity is a difficult formation property to measure accurately, as no technique currently exists for directly measuring formation resistivity in-situ. Instead, resistivity is typically estimated by measuring the amount of electrical current in the formation, usually through LWD operations and the like. An inversion process is typically used that increases the resolution and reliability of the LWD data and thereby improves the accuracy of the resistivity estimations.

Inversion generally entails first building a parametric model of the formation based on a selected set of parameters, then using a computer to predict a log response based on the model. The predicted log response is then compared with measured log data acquired from logging or other operation. The difference between the predicted log and the measured log is thereafter compared and, based on the comparison, the selected model parameters are revised and/or new model parameters are selected. The process is then repeated until the difference between the modeled log and the measured log is minimized within existing computational constraints.

In existing resistivity LWD data analysis, the inversion process is performed either on a point-by-point basis or a sliding window basis for 1D resistivity models (i.e., where the resistivity varies only with depth). Models are then appraised on the basis of a misfit between the acquired resistivity data and predicted resistivity data. However, minimum misfit alone is often a poor metric for appraising inversion performance, as the model associated with the minimum misfit may not be geologically reasonable or realistic.

Accordingly, a need exists for an improved way to appraise the quality of resistivity LWD data.

BRIEF DESCRIPTION OF THE DRAWINGS

For a more complete understanding of the exemplary disclosed embodiments, and for further advantages thereof, reference is now made to the following description taken in conjunction with the accompanying drawings in which.

DESCRIPTION OF EXEMPLARY EMBODIMENTS

Figure 1:
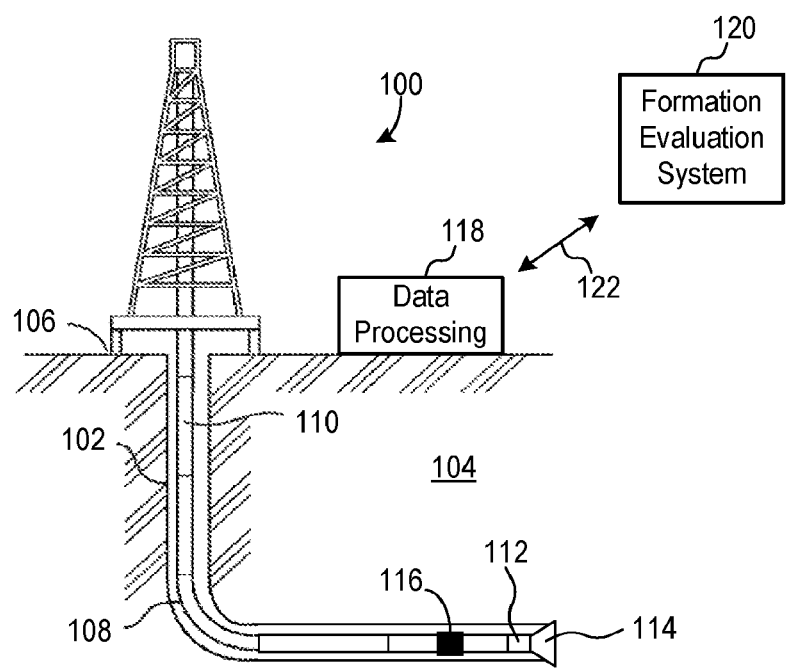
FIG. 1 illustrates an exemplary well in which an inversion appraisal application according to the disclosed embodiments may be used.

The following discussion is presented to enable a person skilled in the art to make and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

The embodiments disclosed herein relate to improved methods and systems for appraising resistivity LWD data inversion and related earth models in geo-steering applications. Rather than simply look for minimum misfits between acquired and predicted resistivity data to verify an earth model, as with existing inversions, the embodiments disclosed herein evaluate several factors that provide an indication of the quality of the resistivity LWD data inversion and resulting models. These quality factors may include, for example, signal-to-noise ratio (SNR), noise-to-signal ratio (NSR), model importance, data importance, model confidence intervals, and the like, as will be discussed herein. The quality factors help to more accurately assess resistivity LWD data inversion, leading to improved formation evaluation and resistivity LWD tool operations for geo-steering (and particularly proactive geo-steering).

In some implementations, the disclosed embodiments analyze the performance of a particular type of inversion referred to as deterministic inversion. As those skilled in the art understand, deterministic inversion generally outputs a single earth model. An advantage of deterministic inversion is that it is more computationally efficient, requiring fewer computational resources, such as laptops, desktops, and the like. The computational efficiency allows for more rapid and robust post-processing when appraising inversion results. In contrast, existing methods of assessing inversion quality are usually based on stochastic or quasi-stochastic inversions. Stochastic inversion generally searches through multiple earth models and outputs multiple earth models or an average of all the earth models. Such stochastic inversions often require real-time well site access to high performance computational resources (e.g., cluster computing) during drilling.

Because of their computational efficiency, the disclosed embodiments may be implemented remotely from the well site. For example, the well site may be connected to one or more remote computing systems over a network (e.g., cloud computing). This avoids the need to have computers at the well site provide the high computational performance mentioned above and also allows modeling and inversion to be done in real time. As well, both serial and/or parallel processing architectures may be used to implement the disclosed embodiments.

An additional benefit is compatibility and applicability to a wide range of tools and services, including any type or design of downhole resistivity LWD tools and services. Examples may include resistivity LWD services for formation evaluation and geo-steering, as well as look-ahead-look-around (LALA) and very deep resistivity (VDR) tools. In general, any resistivity LWD tool or service requiring inversion for resistivity LWD data analysis and interpretation, whether for formation evaluation, look-around-look-ahead, or geo-steering, and particularly distance-to-bed-boundary (DTBB) inversion for geo-steering and formation evaluation, may benefit from the present disclosure.

Referring now to FIG. 1, a drilling rig 100 is shown that may be used to measure formation resistivity as part of an L/MWD operation. The drilling rig 100 is located above a borehole 102 that has been drilled through a subterranean formation 104 from a surface location 106. The surface location 106 is depicted here as an onshore location, but may also be an offshore location or any other location from which the borehole 102 may be drilled. A drill string 108 composed of a continuous length of assembled pipe segments 110 is suspended from the drilling rig 100. The drill string 108 typically has a bottom-hole-assembly (BHA) attached at the end thereof that includes a rotary drilling motor 112 connected to a drill bit 114. A non-inclusive list of BHA components includes: drill pipe, drill collars, agitators, exciters, jars, stabilizers, reamers, hole openers, filter subs, circulation subs, monel or non-magnetic drill collars, crossovers, mud motor, the aforementioned drill bit, and the like. One or more LWD sensors 116 are provided on the drill string 108 for measuring resistivity and other properties of the formation 104. The one or more LWD sensors 116 may be standalone sensors, or they may be installed on a logging tool (not expressly shown) mounted in the BHA.

In accordance with the disclosed embodiments, the LWD sensors 116 communicate the resistivity and other measurements, typically in real time, to a data processing unit 118 located either near the drilling rig 100 and/or at another location as needed. Any suitable transmission method may be used to transmit the resistivity and other measurements to the data processing unit 118, including mud pulse telemetry, acoustic telemetry, electromagnetic telemetry, as well as wiring on the drill string 108, and the like. The data processing unit 118 thereafter stores and/or processes the measurements (e.g., filtering, analog-to-digital conversion, etc.) as needed and sends the processed measurements to a formation evaluation system 120 via a communication link 122.

Figure 2:
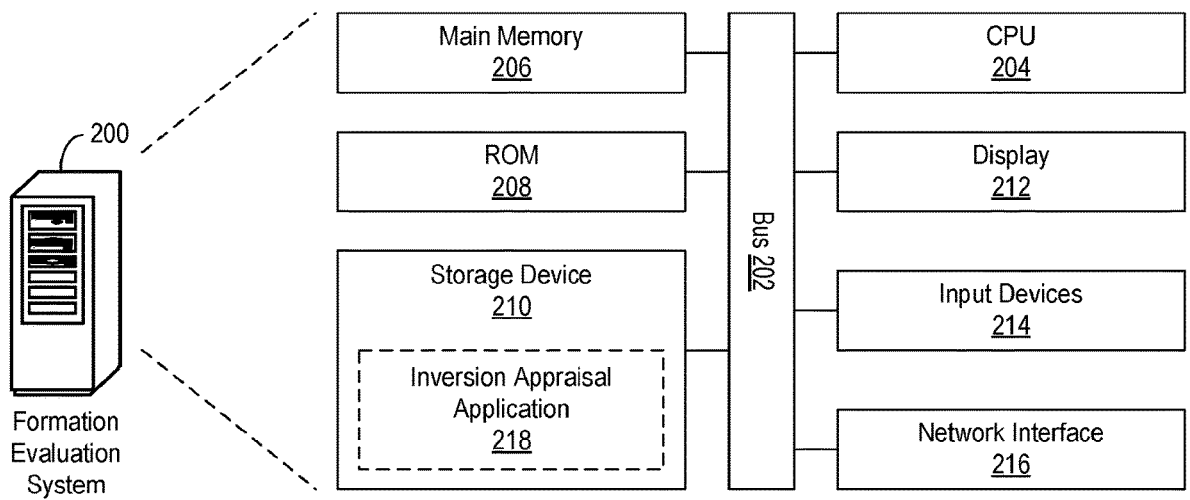
FIG. 2 illustrates an exemplary system that may be used to run the inversion appraisal application according to the disclosed embodiments.

FIG. 2 illustrates an exemplary implementation of the formation evaluation system 120 according to the embodiments disclosed herein. The formation evaluation system 120 may include a conventional computing system, such as a workstation, desktop, or laptop computer, indicated at 200, or it may include a custom computing system developed for a particular application. Such a formation evaluation system 120 may be located on the surface or downhole, in which case data processing occurs downhole as well. In a typical arrangement, the computing system 200 includes a bus 202 or other communication pathway for transferring information among other components within the computing system 200, and a CPU 204 coupled with the bus 202 for processing the information. The computing system 200 may also include a main memory 206, such as a random access memory (RAM) or other dynamic storage device coupled to the bus 202 for storing computer-readable instructions to be executed by the CPU 204. The main memory 206 may also be used for storing temporary variables or other intermediate information during execution of the instructions by the CPU 204.

The computing system 200 may further include a read-only memory (ROM) 208 or other static storage device coupled to the bus 202 for storing static information and instructions for the CPU 204. A computer-readable storage device 210, such as a nonvolatile memory (e.g., Flash memory) drive or magnetic disk, may be coupled to the bus 202 for storing information and instructions for the CPU 204. The CPU 204 may also be coupled via the bus 202 to a display 212 for displaying information to a user. One or more input devices 214, including alphanumeric and other keyboards, mouse, trackball, cursor direction keys, and so forth, may be coupled to the bus 202 for transferring information and command selections to the CPU 204. A communications interface 216 may be provided for allowing the computing system 200 to communicate with an external system or network.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including the wires of the bus 202. Transmission itself may take the form of electromagnetic, acoustic or light waves, such as those generated for radio frequency (RF) and infrared (IR) data communications. Common forms of computer-readable media may include, for example, magnetic medium, optical medium, memory chip, and any other medium from which a computer can read.

In accordance with the disclosed embodiments, an inversion appraisal application 218, or the computer-readable instructions therefor, may also reside on or be downloaded to the storage device 210 for execution. The inversion appraisal application 218 may be a standalone tool or it may be integrated with other LWD tools as part of a commercial geo-steering software (e.g., StrataSteer3D from Halliburton) or earth modeling software (e.g., DecisionSpace from Halliburton, Petrel from Schlumberger; JewelSuite from Baker Hughes, and SKUA from Paradigm) through an appropriate application programming interface (API). Such an appraisal tool 218 may be implemented in any suitable computer programming language or software development package known to those having ordinary skill in the art, including various versions of C, C++, FORTRAN, and the like. Users may then use the appraisal tool 218 to better analyze the resistivity data inversion and related models, and thereby obtain a more accurate estimation of formation resistivity.

Most inversion workflows input observed or measured data, initial model parameters, and inversion controls (e.g., regularization options, termination criteria, etc.) to output predicted data, final model parameters, and inversion metrics (e.g., misfit, etc.). Certain inversion workflows that may be described as "data-driven" or "model-driven" simply bias the inversion inputs. For example, data-driven inversion may use the observed resistivity data to generate initial model parameters without considering any other geological or geophysical information, while model-driven inversion may use other geological or geophysical information and related workflows to generate initial model parameters without any consideration of the observed resistivity LWD data.

Whether generated from data-driven or model-driven workflows, the earth model used in resistivity LWD inversion is often parameterized as multiple 1D resistivity models, where each 1D resistivity model is described by layer boundaries and isotropic or anisotropic conductivities. Layer dip is recovered from the LWD tool orientation with respect to the 1D resistivity model. The multiple 1D resistivity models are stitched together to generate a 2D resistivity image (or "curtain plot") of the formation. Models are routinely appraised on the basis of a misfit between the observed and predicted resistivity LWD data. However, misfit is often a poor metric for appraising inversion performance, as the model associated with the minimum misfit may not be geologically reasonable or realistic. To this end, it is important to provide quality factors or indicators that can quantitatively appraise the resistivity LWD data inversion and models.

A review of well-known inversion theory may be helpful to put the quality factors or indicators disclosed herein in appropriate context, beginning with the well-known discrete operator equation:

$$d = A(m), \quad (1)$$

In the above equation, d is an $N_d$ length vector of observed data, A is a nonlinear modeling operator, and m is an $N_m$ length vector of model parameters. Equation (1) can be expanded as a truncated Taylor series in m such that:

$$d \approx A(m) + J\delta m, \quad (2)$$

where $\delta m$ is the $N_m$ length vector of model parameter perturbations, and J is an $N_d \times N_m$ sensitivity (e.g., Jacobian or Frechet derivative) matrix containing matrix elements:

$$J_{ij} = \frac{\partial d_i}{\partial m_j}, \quad (3)$$

The matrix elements $J_{ij}$ above are the partial derivatives of each datum with respect to changes in each model parameter (i.e., sensitivities). Ideally, these sensitivities may be calculated "exactly" through direct differentiation of the governing equations or via an adjoint operator method. In practice, the sensitivities are often simply approximated as a discrete finite-difference between two forward models:

$$J_{ij} \approx \frac{d_{i,1} - d_{i,2}}{\Delta m_j}. \quad (4)$$

where $\Delta m_j$ is defined as a percentage of the actual model parameter $m_j$. $d_{i,1}$ is the response of $d_i(m_j + \Delta m_j)$ and $d_{i,2}$ is the response of $d_i(m_j)$. Note that equation (4) is accurate only to a first order.

Equation (2) may be rearranged and $J\delta m$ be substituted by r as the $N_d$ length vector of residual errors:

$$r = d - A(m) = J\delta m, \quad (5)$$

As can be seen from Equation (5), the residual error r is minimized through seeking $\delta m$. This residual error term may also be used to define gradient-based terms from previous iterations.

Additionally, in inversion theory there may exist a difference of several orders of magnitude between multi-frequency and multi-component electromagnetic ("EM") data. Without re-weighing (i.e., normalizing) this data, the inversion will preferentially fit high amplitude data, which may unduly dominate the misfit functional $\varphi_D$:

$$\varphi_D = \|d - A(m)\|_D^2. \quad (6)$$

Similarly, there may exist several orders of magnitude difference between model parameters. Without re-weighing (i.e., normalizing) the model parameters, the inversion will preferentially fit the largest value model parameters, which may unduly dominate the stabilizing functional $\varphi_M$:

$$\varphi_M = \|m - m_0\|_M^2. \quad (7)$$

Hence, it is important to reweigh (i.e., normalize) both data and model spaces so as to decrease their dynamic range. To reduce this issue with data and model values and their dynamic range, it is expedient to introduce arbitrary data $W_d$ and model $W_m$ weighting matrices such that:

$$W_d r = W_d J W_m^{-1} W_m \delta m, \quad (8)$$

It is also useful to denote $\tilde{r} = W_d r$, $\tilde{J} = W_d J W_m^{-1}$, and $\delta \tilde{m} = W_m \delta m$ to arrive at a reweighted form of Equation (5):

$$\tilde{r} = \tilde{J} \delta \tilde{m}, \quad (9)$$

The reweighted model parameter perturbations in Equation (9) may be solved as:

$$\delta \tilde{m} = \tilde{J}^+ \tilde{r}, \quad (10)$$

where $\tilde{J}^+$ is a pseudo-inverse of the reweighted sensitivity matrix:

$$\tilde{J}^+ = \begin{cases} (\tilde{J}^T \tilde{J})^{-1} \tilde{J}^T & \text{if } N_m < N_d, \\ \tilde{J}^T (\tilde{J} \tilde{J}^T)^{-1} & \text{if } N_m > N_d. \end{cases} \quad (11)$$

The idea underlying the different pseudo-inverses in equation (11) is to eliminate null-spaces from the inversion. This may be achieved with a singular value decomposition (SVD) of the sensitivity matrix when $N_m < N_d$ (i.e., an over-determined case) or the transpose thereof when $N_m > N_d$ (i.e., an under-determined case). If an over-determined case is assumed, then:

$$\tilde{J} = USV^T, \quad (12)$$

where U is the $N_d \times N_m$ orthogonal matrix of data space eigenvectors, S is the $N_m \times N_m$ diagonal matrix of singular values, and V is the $N_m \times N_m$ orthogonal matrix of model space eigenvectors. The singular values relate the relative importance of the model parameters to the observed data, and vice versa. Those model parameters with large singular values are more relevant (i.e., they influence data), those with small singular values are less relevant, and those with very small singular values are irrelevant (i.e., they do not influence data). It follows that Equation (10) may now take the form:

$$\delta \tilde{m} = VS^{-1}U^T\tilde{r},\qquad(13)$$

However, given the existence of small singular values, $S^{-1}$ is unstable. It may be made unconditionally stable by damping the singular values:

$$\delta \tilde{m} = VDS^{-1}U^T\tilde{r},\qquad(14)$$

where D is an $N_m \times N_m$ diagonal matrix of damping factors:

$$D_i = \frac{t_i^{2k}}{t_i^{2k} + \mu^{2k}},\qquad(15)$$

where $$t_i = \frac{s_i}{s_1}$$

is the relative singular value, μ is the relative singular value threshold, and k is the damping factor. The value of $D_i$ can vary between 1 and 0. If k=1, then Equation (14) reduces to the Marquardt-Levenberg algorithm and the standard form of the Tikhonov regularization. In practice, setting k=1 dampens all except the largest singular values and moreover inflates the smallest singular values. This damping may introduce artifacts, as the singular values of the irrelevant model parameters may become artificially inflated. Higher order damping prevents damping of the largest singular values while not artificially inflating the contributions of small singular values.

Equation (14) may then be iterated until a termination criteria is satisfied. Examples of termination criteria may include a misfit that is below a preset threshold, a misfit that fails to decrease by a preset threshold within a preset number of iterations, a maximum number of iterations is achieved, and the like. The resulting model is thereafter output as the final model with the weighted misfit $\varphi_p$ as a quality metric.

As can be seen from the discussion above, the weighted misfit is a relative term and thus may be misleading. Therefore, the inversion appraisal application 218 discussed herein provides a number of additional and/or alternative quality indicators for assessing inversion, as discussed below.

Signal-to-Noise Ratio (SNR) and Noise-to-Signal Ratio (NSR)

In accordance with the disclosed embodiments, one quality indicator that the inversion appraisal application 218 may provide to appraise the quality of the resistivity LWD data inversion is signal-to-noise ratio (SNR). In general, the signal-to-noise reflects or represents a ratio (which may be weighted or unweighted) of variations in data predicted by the model to variations in misfit for the inversion process. To determine the SNR, in some embodiments, a weighted observed data vector Q and a weighted predicted data vector P may be defined:

$$Q = W_d d,$$

$$P = W_d A(m)$$

If an over-determined case is again assumed where $N_d > N_m$, the standard error σ may be defined as the square root of the variance between Q and P:

$$\sigma = \left\{ \frac{1}{N_d - N_m} \sum_{i=1}^{N_d} (Q_i - P_i)^2 \right\}^{\frac{1}{2}}.\qquad(16)$$

The SNR may then be defined as the inverse square root of the F-statistic for Equation (16), and is a measure of how well variations in the observed data are taken up by variations in the model:

$$SNR = \frac{\left\{ \frac{1}{N_m - 1} \sum_{i=1}^{N_d} (P_i - \overline{P})^2 \right\}^{\frac{1}{2}}}{\sigma},\qquad(17)$$

where $\overline{P}$ is the mean value of the weighted predicted data $P_i$.

Similarly, the inversion appraisal application 218 may also use the reciprocal noise-to-signal ratio (NSR) as a quality indicator. To this end, the minimum value of the relative singular value threshold μ may be set as the NSR:

$$\min\{\mu\} = NSR,\qquad(18)$$

In some embodiments, the inversion appraisal application 218 may use, or may be operated to use, the SNR from one measured depth or an average across multiple measured depths to set the minimum value of the relative singular value threshold μ in an inversion at a subsequent measured depth. This exploits the fact that the SNR of resistivity LWD data will be slowly varying spatially with respect to slow spatial variances in formation resistivity and resistivity LWD tool sensitivity.

In some embodiments, the inversion appraisal application 218 may plot the SNR (or NSR) at each measured depth as traces along with the misfit, standard error, and/or measured or predicted resistivity LWD data, all above an image of the earth model such that a user may visually correlate SNR with the earth model obtained from inversion.

Model Parameter Importance

The inversion appraisal application 218 may also provide model parameter importance as a quality indicator. In general, model parameter importance reflects or represents the norms of ratios of model eigenvectors to model eigenvalues associated with the parameters of the model for the inversion process. Among other things, model parameter importance may help in determining how to parameterize an earth model (e.g., 2-layer, 3-layer, etc.) as well as which model parameters to constrain, make fixed, or leave free to vary.

A model parameter's importance indicates the amount of influence that the model parameter has on the data (i.e., whether the columns of the sensitivity matrix are large or small values). If a column of the sensitivity matrix is small (e.g., zero), this implies that the model parameter has little or no influence on any of the data and vice versa (i.e., none of the data is very sensitivity to the model parameter). Therefore, model parameter importance may be beneficial as a quality metric in that it can help to assess the relative importance of model parameters to the inversion results, and to preferentially select "important" model parameters for the inversion. To this end, model parameter importance may provide a metric of how many degrees of freedom (i.e., how many model parameters) are actually needed.

Since the model eigenvectors (V matrix) are orthogonal, that is, $VV^T=V^TV=I$, then it may be implied that $\Sigma_{i=1}^{N_m}(V_{ji})^2=1$. The damping factors $D_i$ can vary from 1 to 0, as mentioned earlier. It follows that the model parameter importance $I_j$ may be defined as the model eigenvectors rotated by the damping factors:

$$I_j=\Sigma_{i=1}^{N_m}(V_{ji}D_i)^2 \qquad (19)$$

As Equation (19) shows, the model parameter importance $I_j$ is an $N_d$ length vector that is bound between 1 (i.e., important, corresponding to relevant model parameters), and 0 (i.e., unimportant, corresponding to irrelevant model parameters). Nominally, model parameters with an importance greater than about 0.8 may be considered well resolved (i.e., high confidence), and model parameters with an importance less than about 0.5 may be considered poorly resolved (i.e., low confidence).

Using the foregoing equations, the inversion appraisal application 218 may derive and plot the importance for each model parameter, or certain selected model parameters, as traces above an image of the earth model such that a user may visually correlate model parameter importance with the earth model obtained from inversion.

In some embodiments, the inversion appraisal application 218 may also adjust, or may be operated to adjust, the model parameters on the basis of model parameter importance. For example, if a 3-layer DTBB inversion shows consistently low importance for a particular DTBB parameter, the inversion appraisal application 218 may automatically adjust subsequent inversions as 2-layer DTBB inversions such that additional degrees of freedom are restricted. Similarly, if a 2-layer DTBB inversion shows consistently high importance for all model parameters, the inversion appraisal application 218 may automatically adjust subsequent inversions as a 3-layer DTBB inversion such that additional degrees of freedom are permitted.

Data Importance

The inversion appraisal application 218 may additionally provide data importance as a quality indicator. Among other things, this quality indicator may help in choosing which channels of data to use for an inversion.

In general, data importance (which may be damped or undamped) reflects or represents the norms of the data eigenvectors for the inversion process and affects whether the rows of the sensitivity matrix are large or small. If a row of the sensitivity matrix is small (e.g., zero), it may be implied that none of the model parameters have very much influence on the datum and vice versa (i.e., the datum has little or no sensitivity to any of the model parameters). Thus, data importance may be a beneficial quality metric to use, as it can help assess the relative importance of data to the inversion results and to preferentially select "important" data for inversion.

As well, because the data eigenvectors (i.e., U matrix) are generally orthogonal, meaning $UU^T=U^TU=I$, it may be implied that $\Sigma_{j=1}^{N_d}(U_{ji})^2=1$. And because the damping factors $D_i$ may again vary from 1 to 0, it follows that the data importance $I_j$ may be defined as the model eigenvectors rotated by the damping factors:

$$I_j=\Sigma_{i=1}^{N_m}(U_{ji}D_i)^2 \qquad (20)$$

In the above equation, the data importance parameter $I_j$ is an $N_d$ length vector that is bound between 1 (i.e., important) and 0 (i.e., unimportant). Nominally, data with an importance greater than about 0.8 may be considered important and data with an importance less than about 0.5 may be considered unimportant.

Using the above equations, the inversion appraisal application 218 may derive and plot the importance for each type of data, or certain selected data, as traces along with the misfit, standard error, and/or measured or predicted resistivity LWD data above an image of the earth model such that a user may be able to visually correlate data importance with the earth model obtained from inversion. From visual inspection of the data importance, the user may select different data for subsequent inversions so as to ensure that all selected data are considered important for the inversion.

In some embodiments, the inversion appraisal application 218 may also use, or may be operated to use, the data importance to automatically select which data are to be selected for subsequent inversions. For example, a threshold for data importance may be determined and only channels with a data importance value above the threshold may be selected for inversion. Alternatively, channels with the highest N data importance may be selected, where N is equal or larger than the total number of unknown parameters in the inversion.

Confidence Intervals

The inversion appraisal application 218 may also provide a model parameter confidence interval as a quality factor. This quality factor gives the user a quantitative metric of the confidence in the earth model generated.

In general, the model parameter confidence interval (which may be damped or undamped) reflects or represents the norms of the ratios of model eigenvectors to model eigenvalues associated with parameters of the model for the inversion process. Confidence intervals for model parameters are typically expressed in terms of upper and lower bounds (e.g., P90, P95, etc.) and may be calculated using the Cramer-Rao multipliers $B_j$:

$$B_j=\left\{\sum_{i=1}^{N_m}\left(\frac{V_{ji}}{s_i}\right)^2\right\}^{\frac{1}{2}}. \qquad (21)$$

where $s_i$ is the $i^{th}$ diagonal component of the S matrix and $v_{ji}$ is similarly the $j^{th}$ row and $i^{th}$ column of the V matrix. For model parameters that are less relevant or irrelevant (i.e., $s_i \to 0$), the Cramer-Rao multipliers may be very large and represent significant uncertainty in the model parameters. Thus, large variability in values for irrelevant model parameters reflects that the parameters have little to no effect on the data.

However, in practice, it may be preferable to use the damped Cramer-Rao multipliers:

$$B_j=\left\{\sum_{i=1}^{N_m}D_i\left(\frac{V_{ji}}{s_i}\right)^2\right\}^{\frac{1}{2}}. \qquad (22)$$

These damped Cramer-Rao multipliers reflect how much the inversion can allow the model parameters to vary, regardless of the true uncertainty. For this reason, an irrelevant model parameter may have small Cramer-Rao multipliers. However, the model importance for that parameter will indicate that the model parameter is irrelevant and thus lacks confidence.

If the inversion was performed with respect to the logarithms of the model parameters (i.e., log space), then the confidence intervals may be calculated as follows:

$$m_j^{\pm}=m_j\exp(\pm CB_j\sigma) \qquad (23)$$

Otherwise, the confidence intervals may be calculated in linear space as:

$$m_j^\pm = m_j \pm CB_j\sigma, \quad (24)$$

where $m_j^\pm$ are the upper (+) and lower (−) bounds of a confidence interval C for the parameter $m_j$. If the 90% confidence interval (i.e., P90) is used, then C=1.645. If the 95% confidence interval (i.e., P95) is used, then C=1.96.

Based on the foregoing equations, the inversion appraisal application 218 may derive and plot the confidence intervals for each model parameter, or certain selected model parameters, as traces above an image of the earth model such that a user may visually correlate confidence intervals with the earth model obtained from inversion.

Figure 3:
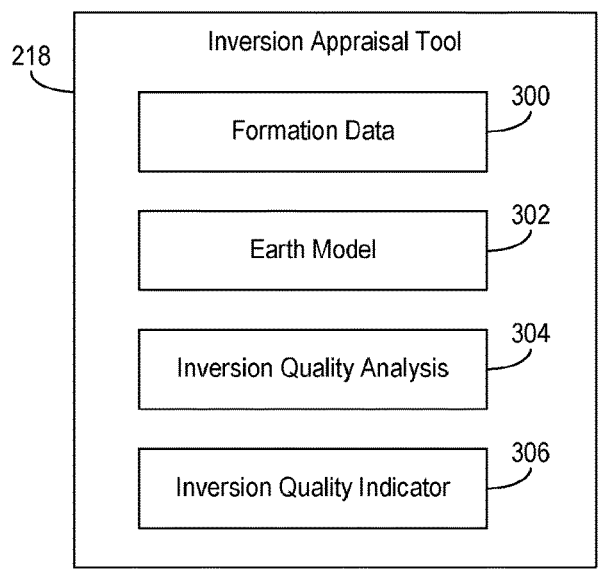
FIG. 3 illustrates an exemplary implementation of the inversion appraisal application according to the disclosed embodiments.

Referring now to FIG. 3, an exemplary implementation of the inversion appraisal application 218 is shown according to the disclosed embodiments. In this example, the inversion appraisal application 218 is composed of a number of functional components, including a formation data component 300, an earth model component 302, an inversion quality analysis component 304, and an inversion quality indicator component 306. Note that although the various components 300-306 are depicted here as discrete blocks, it should be understood that any block may be divided into two or more constituent blocks and that two or more blocks may be combined to form a single block without departing from the scope of the exemplary disclosed embodiments.

In general operation, the formation data component 300 is primarily responsible for inputting the resistivity LWD data and other formation data and subsequent processing thereof (e.g., filtering, mapping various data fields, etc.). The resistivity LWD data may be acquired via any LWD tool and associated sensors, such as the one or more sensors 116 (see FIG. 1), known to those skilled in the art. Exemplary tools may include the Azimuthal Deep Resistivity Sensor (ADR™) and the Azimuthal Deep Resistivity Sensor (AFR™) available from Halliburton Energy Services, Inc. The resistivity LWD data and other formation data may thereafter be downloaded by or otherwise inputted to the formation data component 300 using an appropriate data format, either in real time or on a delayed basis.

The earth model component 302 is primarily responsible for generating or otherwise obtaining an earth model for the formation. In some embodiments, the earth model component 302 may generate the earth model using a selected set of model parameters together with the resistivity LWD data and other formation data acquired by the formation data component 300 along with a priori geological information about the formation. Alternatively, the earth model may be generated separately and subsequently downloaded by or otherwise inputted to the earth model component 302. In either case, the inversion process used to generate the earth model is preferably a deterministic inversion process.

Once the resistivity LWD data and the earth model have been obtained, the inversion quality analysis component 304 performs an appraisal of the inversion resulting in the earth model. In some embodiments, the inversion quality analysis component 304 may perform the appraisal by first performing eigenvalue decomposition, or eigen-decomposition, on the measurements (i.e., formation data) and the earth model. In general, eigen-decomposition decomposes a matrix A into a multiplication of a matrix of eigenvectors V and a diagonal matrix of eigenvalues $\lambda$, that is, $AX=\lambda X$. The results of the eigen-decomposition may then be used to analyze the inversion process. Specifically, the inversion quality analysis component 304 may analyze the SNR (as well as the NSR in some cases) for the data, the importance of various types of data used for the earth model, the importance of various parameters used for the earth model, and the confidence intervals for the various parameters used for the earth model. In some embodiments, the inversion quality analysis component 304 may perform such appraisal using the equations (e.g., Equations (17) to (24)) set forth above.

The inversion quality indicator component 306 thereafter displays or otherwise provides a visual indicator of the quality of the inversion resulting in the earth model. In some embodiments, the inversion quality indicator component 306 may present the quality indicators as traces along with the misfit, standard error, and/or measured or predicted resistivity LWD data, all above an image of the earth model so a user may visually correlate the quality indicators with the earth model obtained from inversion. In addition (or alternatively), the inversion quality indicator component 306 may also present the quality indicators as pop-up windows that automatically appear over the earth model when a user hovers a cursor over or other clicks various points along the earth model. Exemplary illustrations of the quality indicators that may be provided by the inversion quality indicator component 306 are discussed with respect to FIGS. 4-11.

Figure 4:
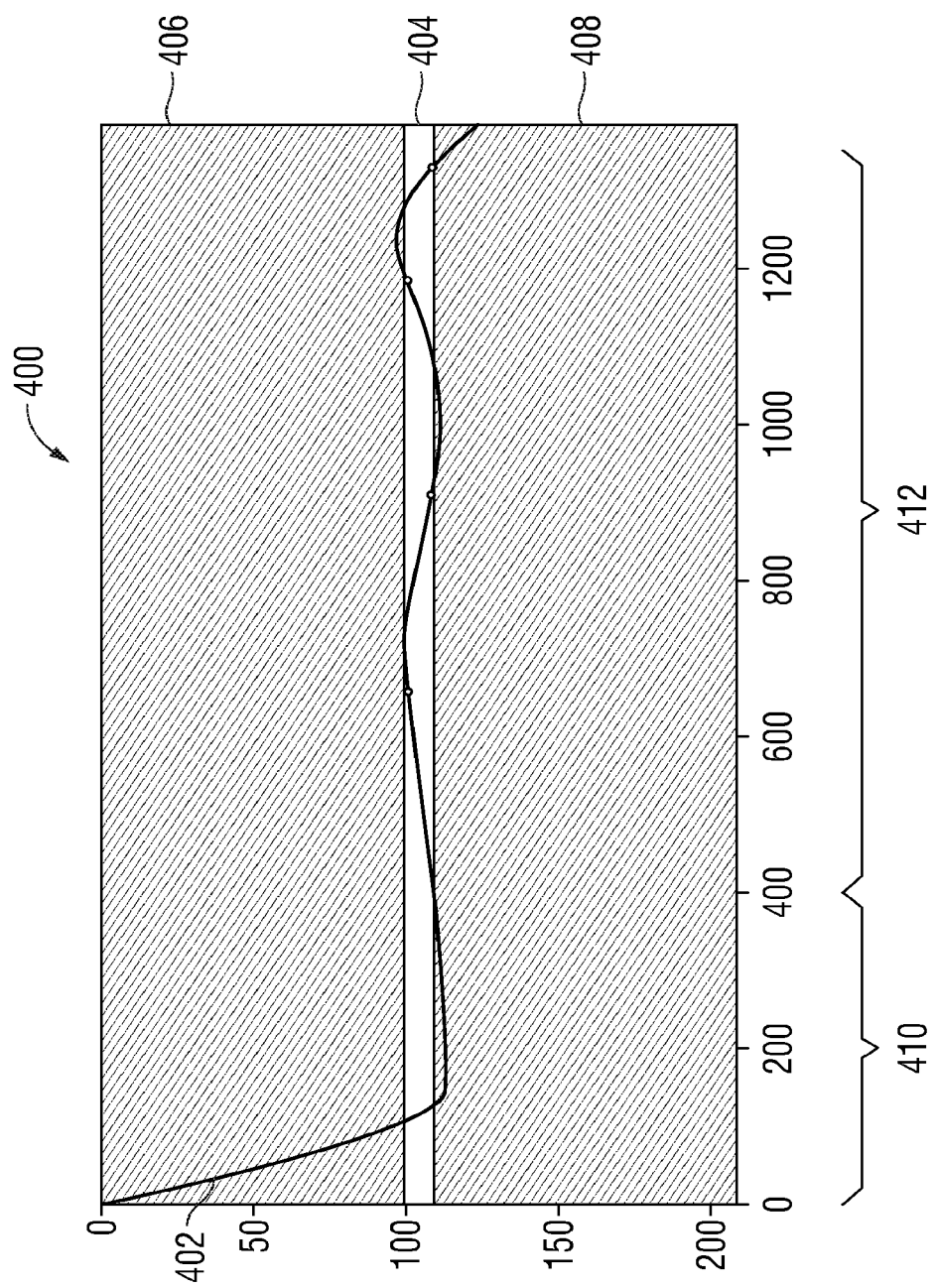
FIG. 4 illustrates an exemplary well path through a 3-layer synthetic earth model that may be analyzed using the inversion appraisal application.

Turning now to FIG. 4, an example of a 3-layer synthetic earth model 400 is displayed (e.g., on a display screen) for purposes of illustrating how the quality indicators discussed above may be used to appraise the acquired resistivity LWD data. In the synthetic earth model 400, a well path 402 is being drilled through a 32-foot thick reservoir 404 between an upper shoulder bed 406 and a lower shoulder bed 408. The shoulder beds 406, 408 each have about 2 ohm-m resistivity and the reservoir 404 has about 20 ohm-m resistivity in this example. The portion of the well path 402 that has already been drilled is indicated at 410, while the planned trajectory of the well path 402 is indicated at 412. Resistivity LWD data may then be simulated for a certain depth of investigation or DOI (e.g., 2 m) along the well path trajectory 412 and an inversion process may then be used to refine the earth model 400.

Figure 5:
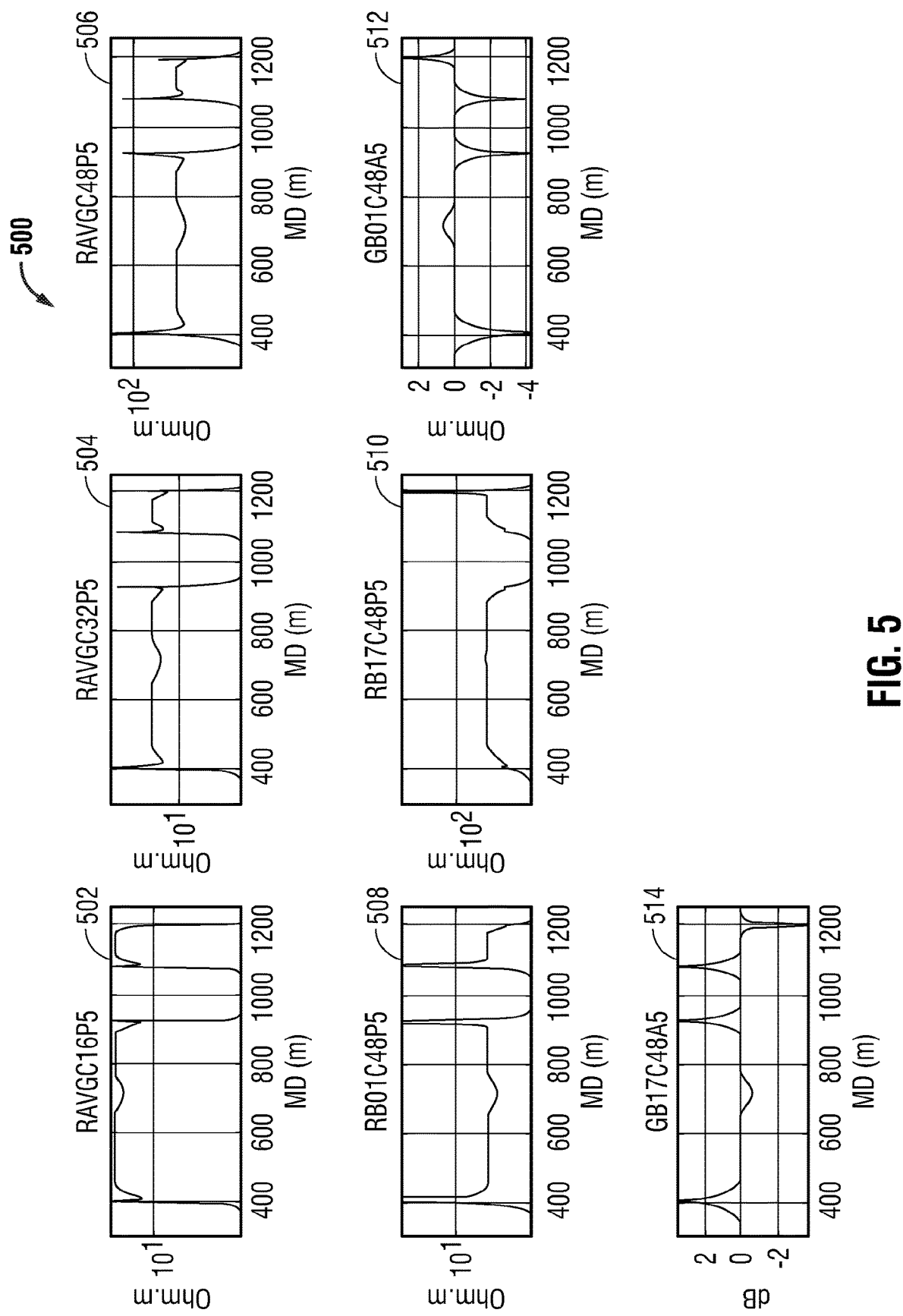
FIG. 5 illustrates simulated logging data for the well path of FIG. 4 that may be analyzed using the inversion appraisal application.

FIG. 5 shows simulated real-time LWD data for the well path 402 through the 3-layer synthetic earth model 400 in FIG. 4. In this example, the LWD data was obtained via a simulation of the Azimuthal Deep Resistivity Sensor (ADR™) from Halliburton for the well path 402. This Halliburton LWD tool provides improved resistivity measurement quality and also adds several advantages for geosteering applications, including introduction of azimuthal sensitivity and deep-reading geo-signals in addition to the resistivity measurements. The data provided by the tool includes average formation resistivity, indicated by plots 502, 504, and 506, each plot representing resistivity data from a different data channel, as well as azimuthal resistivity plots 508, 510, and 512, and a geo-signals plot 514 (derived from electromagnetic signals transmitted by the tool). The data channels reflect different signal frequencies and spacing for the sensors in the tool.

Figure 6:
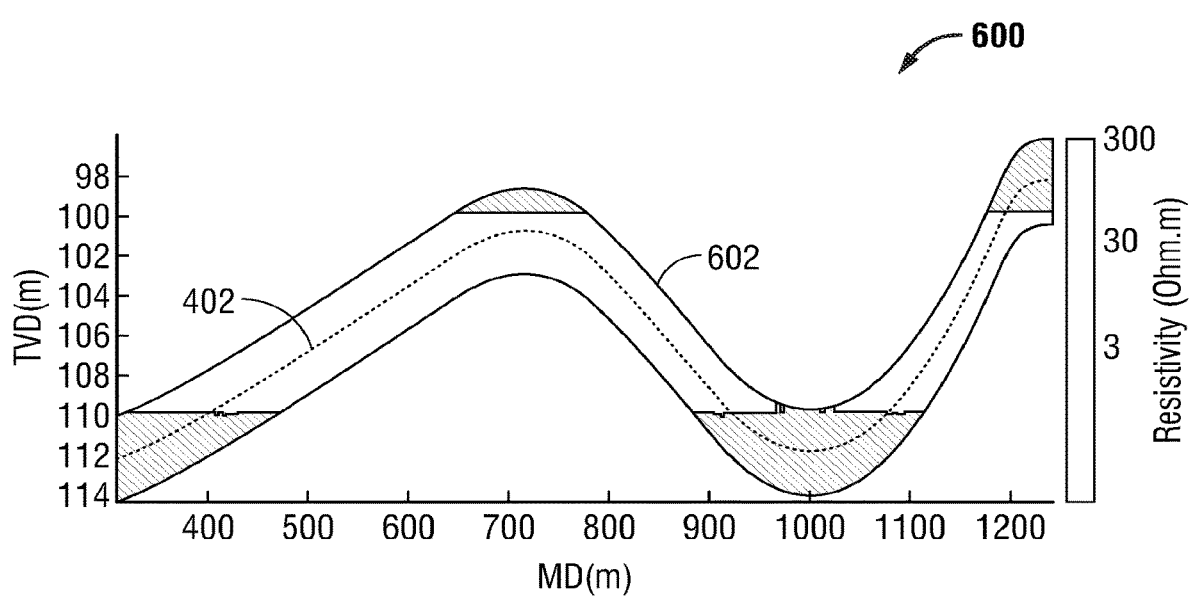
FIG. 6 illustrates a curtain plot of a 3-layer DTBB inversion for the well path of FIG. 4 provided by the inversion appraisal application.

FIG. 6 depicts a plot 600 of a 3-layer DTBB inversion for the well path 402 through the 3-layer synthetic earth model of FIG. 4, as displayed by the inversion appraisal application 218 on a display screen. The 3-layer DTBB inversion in this example is a deterministic inversion performed using the resistivity LWD data described previously in FIG. 5. In the present figure, the vertical axis represents true vertical depth (TVD) while the horizontal axis represents measured depth (MD). The earth model resulting from the inversion, shown here as a "curtain plot" 602, is clipped with a DOI of roughly 2 meters radially around the well path 402. Various quality indicators may then be plotted as traces above the earth model 602 in a manner that would allow a user to visually correlate data quality with the earth model 602, as discussed below.

Figure 7:
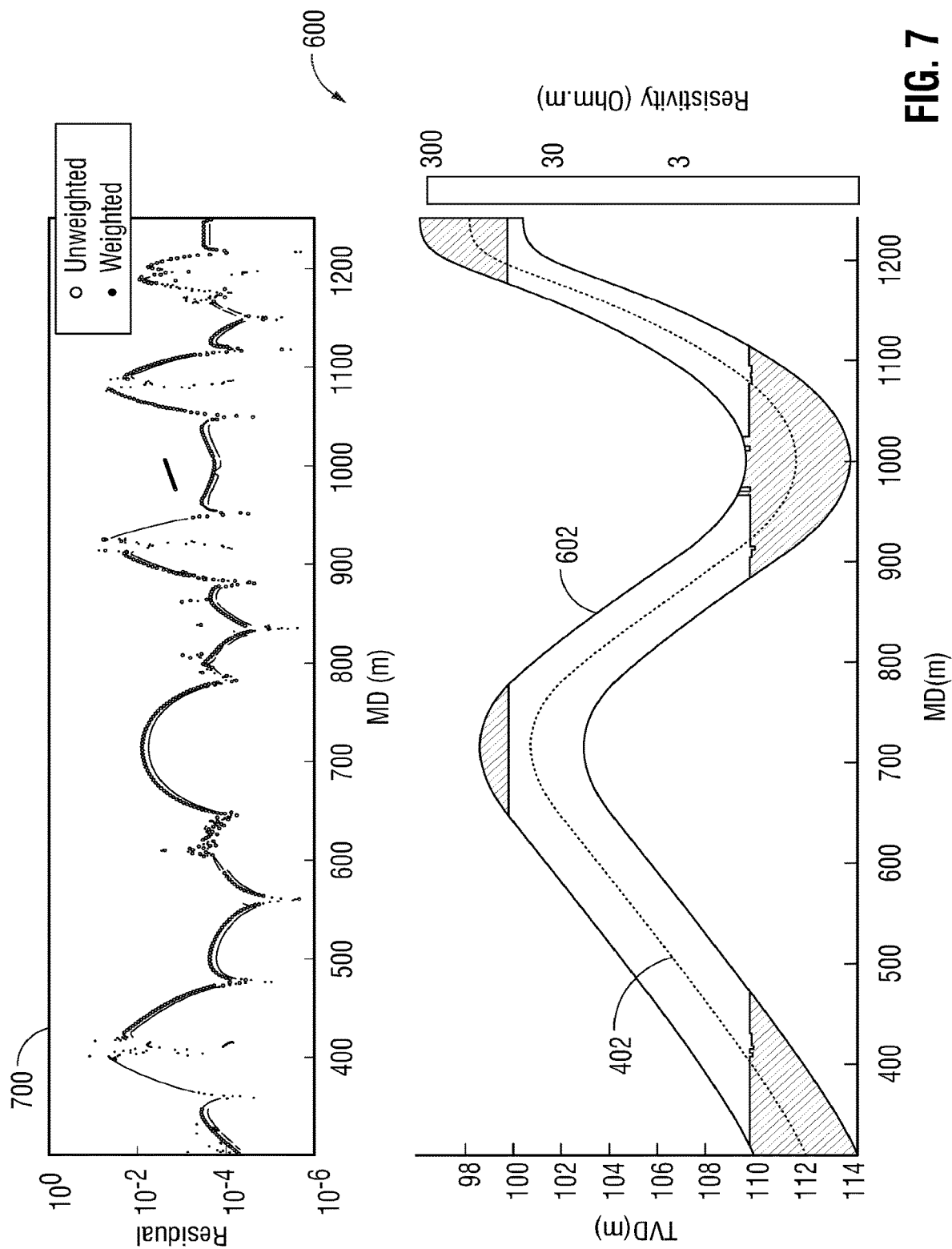
FIG. 7 illustrates an exemplary track of weighted and unweighted misfit provided by the inversion appraisal application.

FIG. 7 is a plot 700 showing traces of misfit above the 3-layer DTBB inversion earth model from the previous figure, as displayed by the inversion appraisal application 218. The vertical axis represents misfit in terms of residual error (see Equation (5)), normalized to 1, with smaller residuals reflecting smaller misfit. There are two traces of residuals, unweighted and weighted (see Equation (6)), with both traces largely tracking one another and showing about the same degree of misfit along the well path 402. As these traces show, the misfit tends to be smaller when the well path 402 is near a bed boundary (e.g., near MD of 400 m, 700 m, 900 m, and 1100 m) and tends to be larger when the well path 402 is further away from a bed boundary (e.g., near MD of 600 m, 850 m, and 1150 m). However, as explained above, when used as the sole inversion criterion, misfit may be a misleading quality indicator.

Figure 8:
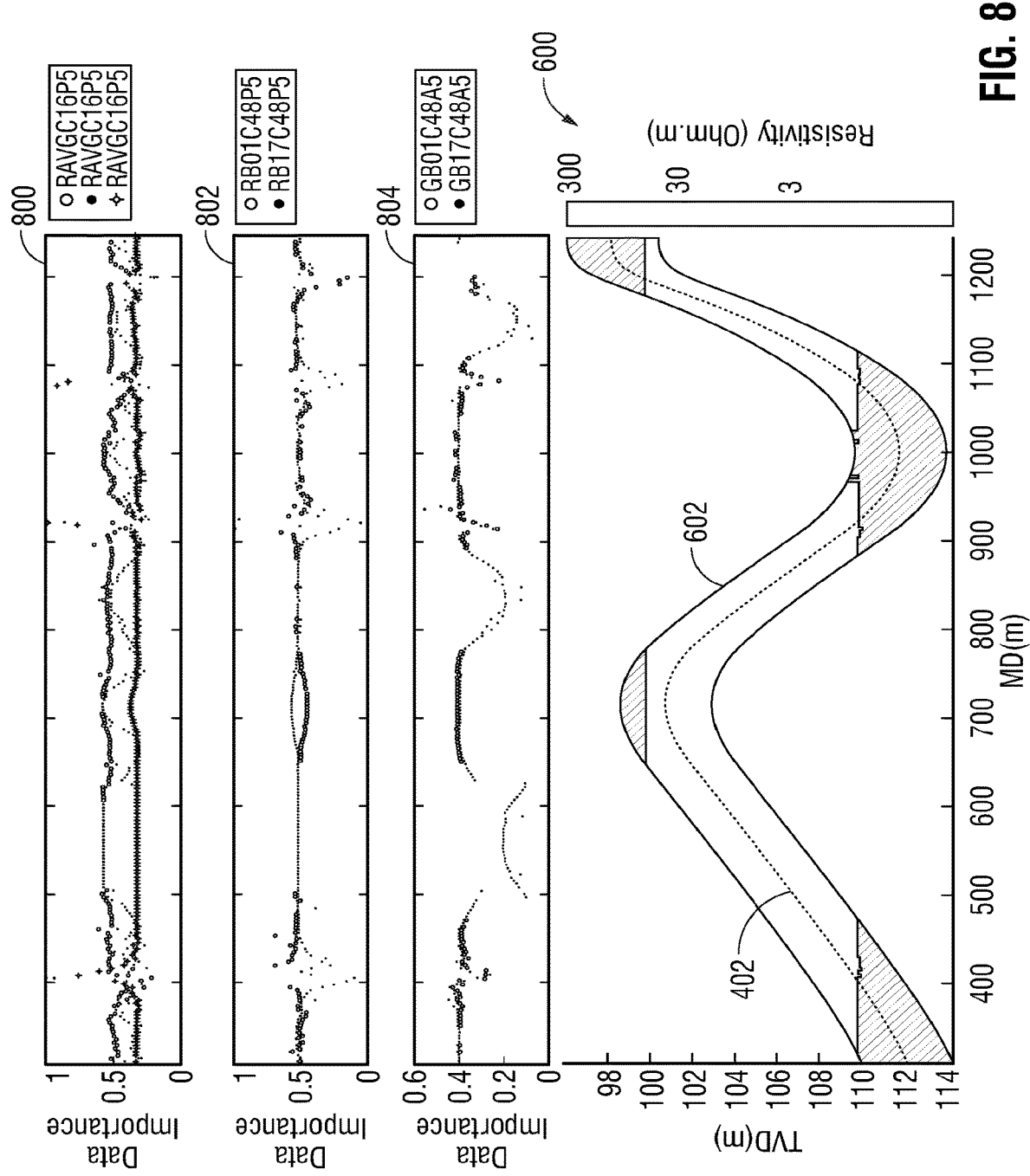
FIG. 8 illustrates exemplary tracks of data importance provided by the inversion appraisal application.

Therefore, turning now to FIG. 8, data importance may additionally be used as an inversion quality indicator according to the disclosed embodiments. FIG. 8 illustrates several plots showing tracks of data importance derived from the data discussed in FIG. 5, as displayed by the inversion appraisal application 218 (e.g., on a display screen). The plots include a first plot 800 for average resistivity (upper panel), a second plot 802 for azimuthal resistivity (middle panel), and a third plot 804 for geo-signals (lower panel). In these plots 800, 802, 804, the vertical axes represent data importance, again normalized to 1, and larger values indicate higher data importance while smaller values indicate lower data importance.

Looking at the geo-signals plot 804, for example, it can quickly be seen that geo-signals data has less importance at a measured depth between about 500 m and 600 m, about 800 m and 900 m, and at around 1150 m. From this data importance, a user may be able to surmise that at these measured depths, geo-signals data may not have very much influence on the earth model.

Figure 9:
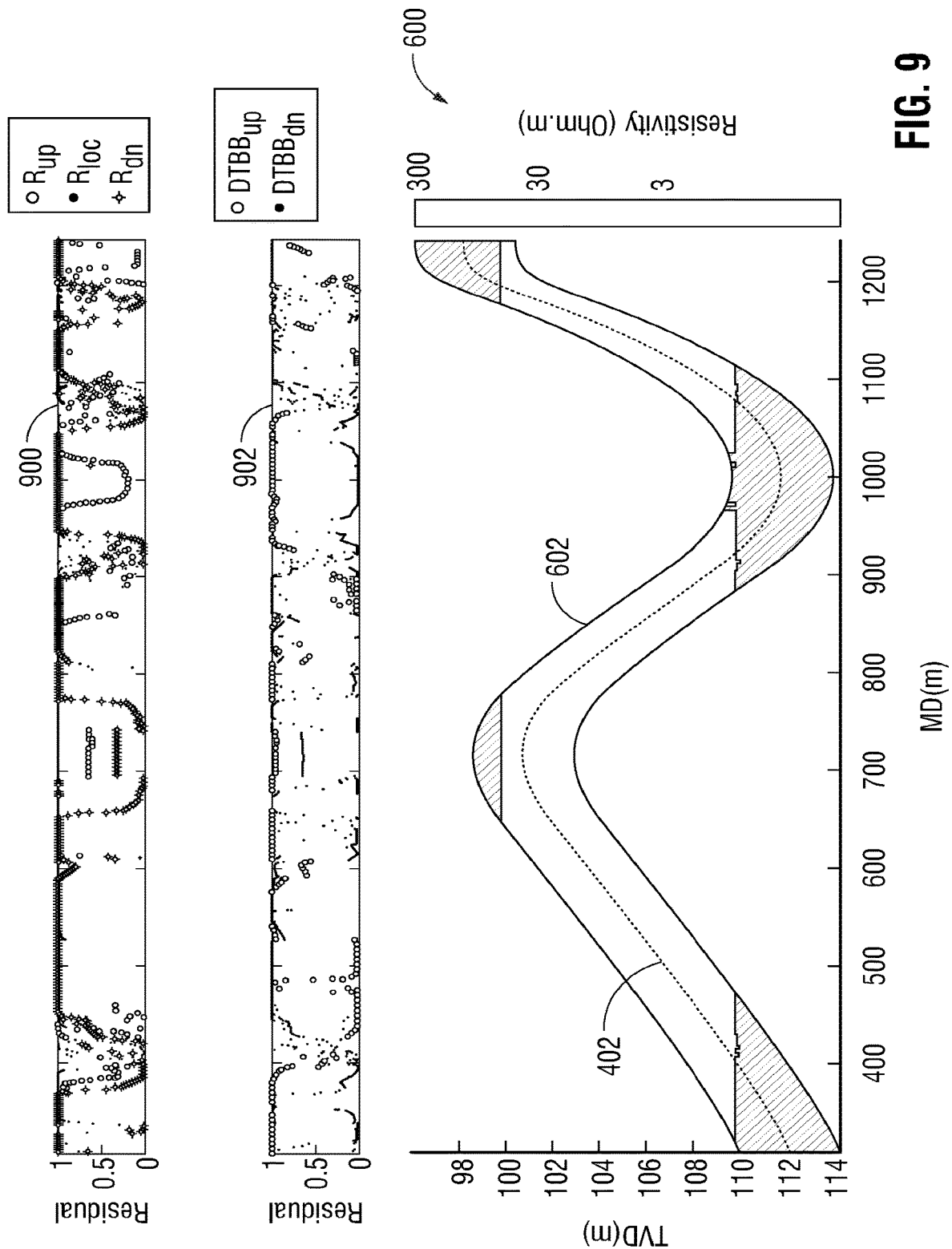
FIG. 9 illustrates exemplary tracks of model importance provided by the inversion appraisal application.

FIG. 9 similarly shows model importance being used as an inversion quality indicator according to the disclosed embodiments. Two plots 900 and 902 are displayed by the inversion appraisal application 218 reflecting model importance for the resistivity of each layer in the earth model and the DTBB parameters, respectively, as derived from the data in FIG. 5. More specifically, the upper plot 900 illustrates model importance for the resistivity ($R_{up}$) of the upper bed 406, the resistivity ($R_{IOC}$) of the reservoir 404, and the resistivity ($R_{dn}$) of the lower bed 408 (see FIG. 4). The lower plot 902 illustrates model importance for the distance (DTBB$_{up}$) from the well path 402 to the boundary of the upper bed 406 and the distance (DTBB$_{dn}$) from the well path 402 to the boundary of the lower bed 408. The unlabeled vertical axes represent model importance, again normalized to 1, and larger values indicate higher model importance while smaller values indicate lower model importance.

As FIG. 9 shows, the DTBB plot 902 reflects a decrease in model importance as the LWD tool approaches a reservoir/bed boundary (e.g., MD of 400 m, 900 m, and also 1100 m). Accordingly, a user may be able to discern that the DTBB parameters may not have very much influence on the earth model at these measured depths.

Figure 10:
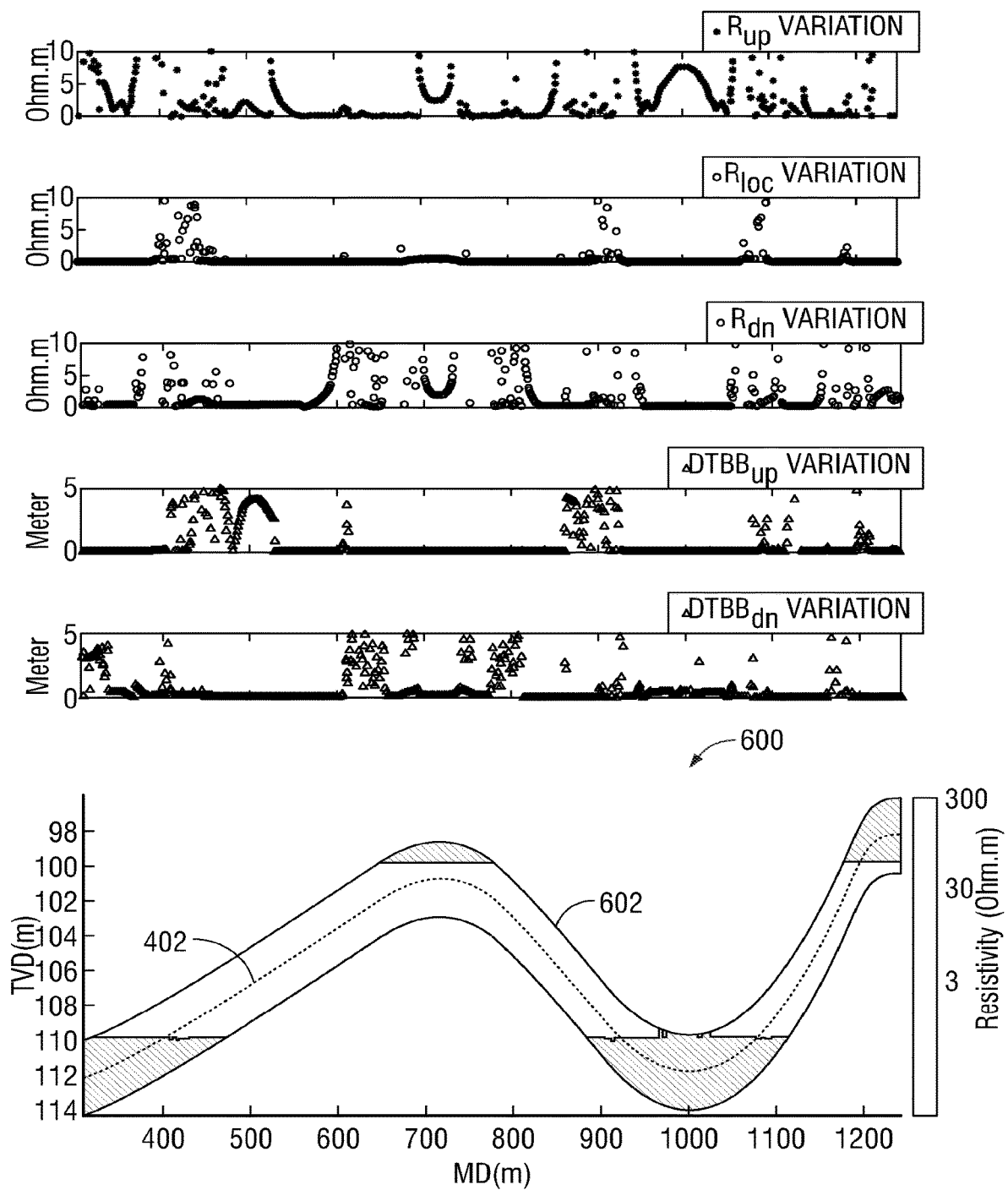
FIG. 10 illustrates exemplary tracks of confidence intervals provided by the inversion appraisal application.

FIG. 10 shows confidence intervals (i.e., variances) being used as a quality indicator in inversion according to the disclosed embodiments. Here, plots for P95 confidence intervals are displayed by the inversion appraisal application 218 for the resistivity of each layer in the earth model and also the distances to the bed boundaries, as derived from the data depicted in FIG. 5. The first plot 1000 shows the P95 confidence interval for the resistivity ($R_{up}$) of the upper bed 406, the second plot 1002 shows the P95 confidence interval for the resistivity ($R_{IOC}$) of the reservoir 404, and the third plot 1004 shows the P95 confidence interval for the resistivity ($R_{dn}$) of the lower bed 408. The fourth plot 1006 shows the P95 confidence interval for the distance (DTBB$_{up}$) from the well path 402 to the boundary of the upper bed 406, and fifth plot 1008 shows the P95 confidence interval for the distance (DTBB$_{dn}$) from the well path 402 to the boundary of the lower bed 408. The vertical axes for plots 1000, 1002, 1004 represent variation in resistivity normalized to 10, and the vertical axes for plots 1006, 1008 represent variation in depth normalized to 5. These variations indicate how much LWD data for the resistivity and the DTBB may swing at various points along the well path 402, with larger variability indicating lower confidence while smaller variability indicates higher confidence.

In the example of FIG. 10, the $R_{dn}$ plot 1004 has large variability between a measured depth of 600 m and 800 m. This indicates that as the LWD tool moves further away from the lower bed 408, the resistivity LWD data for the lower bed can vary greatly. Accordingly, a user may be able to glean that resistivity LWD data between these measured steps (600 m and 800 m) may not be particularly useful in the earth model.

Figure 11:
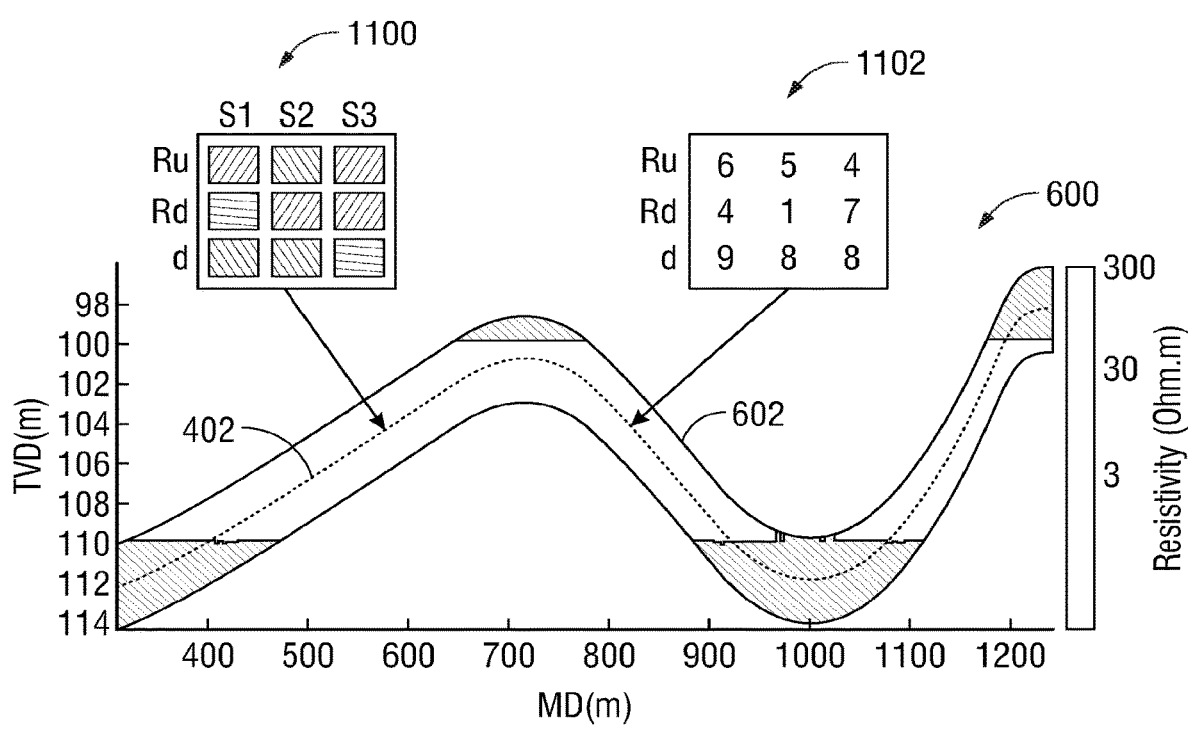
FIG. 11 illustrates an exemplary workflow that may be used with the inversion appraisal application according to the disclosed embodiments.

FIG. 11 illustrates an alternative visualization of model parameter importance and confidence intervals, as displayed by the inversion appraisal application 218 according to the disclosed embodiments. Instead of these quality indicators being displayed as traces above the earth model, the quality indicators may be displayed as pop-up windows 1100 and 1102 on the plot 600. The pop-up windows 1100, 1102 may be in the form of a matrix having a plurality of element, each element indicating a level of quality for a given quality metric. When a user hovers over or otherwise clicks on a point in the well path 402 (see arrows), one or both of the windows 1100, 1102 may appear on the display.

In this example, the first pop-up window 1100 is a visualization of Jacobian matrix elements with columns representing model parameter importance for upper bed resistivity ($R_u$), lower bed resistivity (Rd), and vertical depth (d) and rows representing exemplary signals S1, S2, and S3. In some embodiments, each element of the matrix may be colored according to an appropriate color coding scheme, such as green for high importance, yellow for medium importance, and red for low importance, to indicate degree of importance. Here, upper bed resistivity ($R_u$) has high importance for S1 and S3 and thus is green (light gray), but low importance for S2 and thus is red (dark gray).

In a similar manner, the second pop-up window 1102 is also a matrix with columns representing P95 confidence intervals normalized to 10 for upper bed resistivity ($R_u$), lower bed resistivity (Rd), and vertical depth (d) and rows representing S1, S2, and S3. However, instead of colors, each cell in the matrix may contain a numerical value indicating variability, with larger values indicating greater variability (and hence less confidence) while smaller values indicate less variability (and hence greater confidence). In the example shown, the upper bed resistivity ($R_u$) has a high variability of 6 for S1, low variability of 2 for S3, and medium variability of 4 for S2.

Collectively, the quality indicators in FIGS. 7 to 11 provide users with a quantitative assessment of which data is providing useful information, which parts of the earth model may be trusted, and conversely which parameters in which parts of the model to question. It should be noted that while these quality indicators can be helpful, those having ordinary skill in the art still need to apply logic and reason to the analysis. For example, because model importances and variances may often be damped (as was assumed herein), model parameters that are in fact geologically irrelevant may sometimes appear to have high importances and small variances.

Thus far a number of specific implementations of an inversion appraisal application have been described. Those having ordinary skill in the art will understand that modifications and alternatives may be made without departing from the scope of the disclosed embodiments. For example, while a particular type of deterministic inversion (i.e., damped SVD) has been discussed herein, the disclosed embodiments may be implemented with any suitable type of deterministic inversion. Also, while 1D earth models have been discussed herein, the disclosed embodiments may be applied to any earth model dimensionality (e.g., 1D, 2D, and 3D). Additionally, the disclosed embodiments may be applied to both real-time and memory-based model resistivity LWD data. As well, the disclosed embodiments may be applied equally to pre-drilling planning (e.g., modeling responses of a well path to determine optimal well placement) and also to understand what parameters of the model can be recovered with confidence. Similarly, the EM and attributes of the earth models may include resistivity, conductivity, permittivity, permeability, chargeability, and other induced polarization (IP) parameters. These EM attributes may also be either isotropic or anisotropic. Any resistivity LWD tool design may be used without departing from the scope of the disclosed embodiments.

Figure 12:
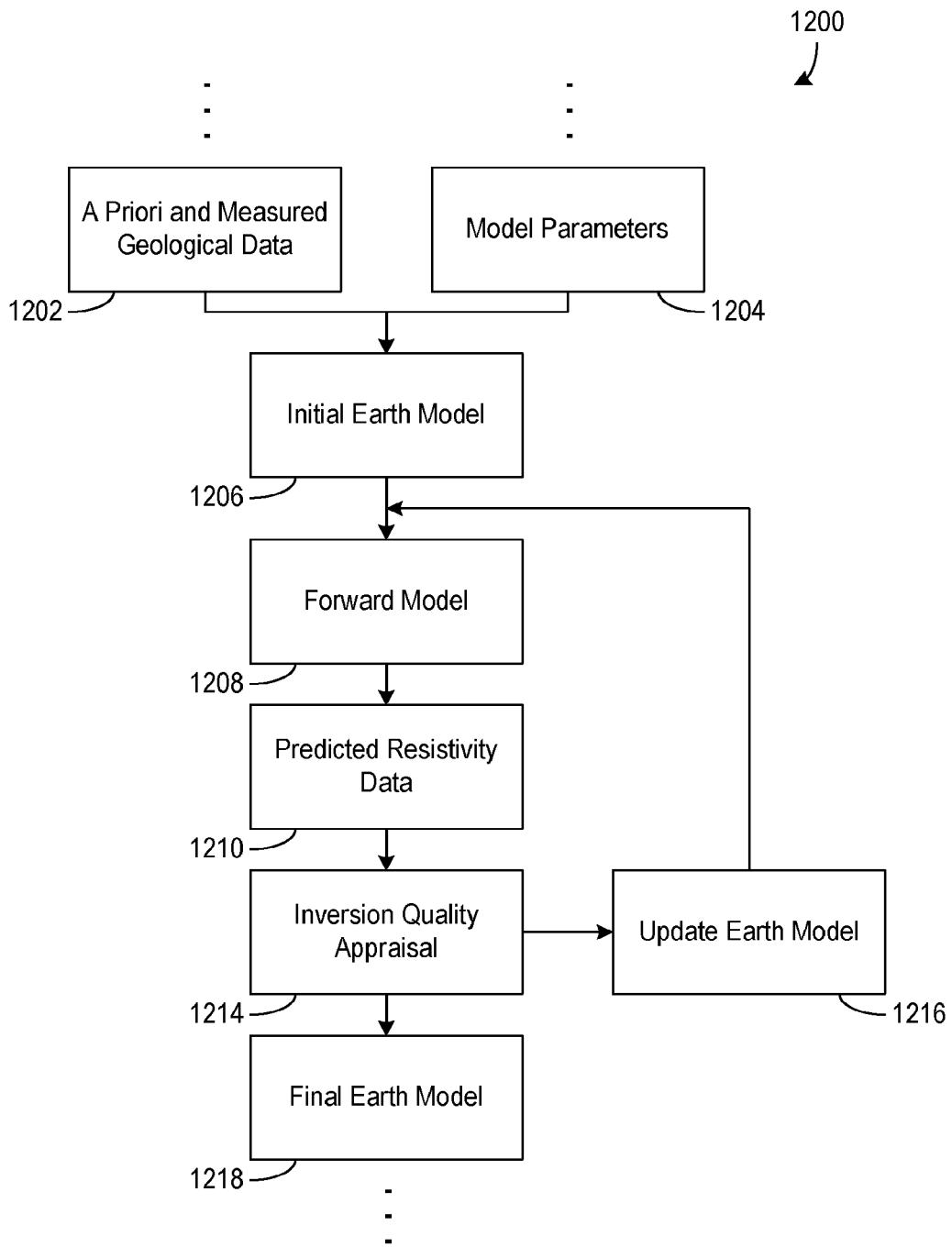

Accordingly, following now in FIG. 12 are general guidelines in the form of a workflow 1200, or portion thereof, outlining a method that may be used to implement the inversion appraisal discussed herein. Those having ordinary skill in the art will understand of course that alternative arrangements may be derived from the teachings presented herein without departing from the scope of the disclosed embodiments.

As can be seen in FIG. 12, the workflow 1200, or portion thereof, begins at block 1202 where a priori and measured geological data, including resistivity data, for the well path is provided. The a priori data may be obtained from a database or other repository of such data while the measured data may be acquired via an LWD operation. At block 1204, a set of model parameters are provided for use in generating an initial earth model at block 1206. At block 1208, the a priori and measured data and the earth model are used to calculate a forward model. The forward model is thereafter used to generate predicted resistivity data at block 1210 (e.g., for proactive geo-steering purposes) as part of a deterministic inversion process.

In accordance with the disclosed embodiments, an analysis is performed on the predicted resistivity data at block 1214 to appraise the quality of the inversion. For example, the appraisal may involve a determination of SNR, NSR, data importance, model parameter importance, model parameter confidence interval, and other quality indicators for the inversion, as described above, along with misfit and standard error. One or more of these quality indicators may then be displayed or otherwise presented to a user to appraise the quality of the inversion. The quality indicators allow the user to determine, for example, which data is providing useful information, which parts of the earth model is reliable, and conversely which parameters in which parts of the model may need to be modified. The earth model may then be updated at block 1216 either automatically or as deemed appropriate by the user, or a combination of both, and the workflow 1200 returns to block 1208 to continue the inversion process. If no updates are needed to the earth model, then the latest earth model is finalized at block 1218.

Accordingly, as set forth above, the embodiments disclosed herein may be implemented in a number of ways. For example, in general, in one aspect, the disclosed embodiments may relate to a system for appraising resistivity inversion performance in geo-steering. The system may comprise, among other things, a logging tool and at least one sensor mounted on the logging tool. The at least one sensor is configured to measure signals along a portion of a well path, the signals representing one or more formation properties. The system may additionally comprise a formation evaluation system coupled to acquire data representing the signals, the formation evaluation system configured to perform an inversion process using the data and a model that is derived from the data. The system may further comprise an inversion appraisal application residing in the formation evaluation system, the inversion appraisal application operable to perform an eigenvalue decomposition on the data and the model, use a result of the eigenvalue decomposition to perform an analysis of the inversion process, and provide at least one inversion quality indicator for the inversion process based on the analysis.

In general, in another aspect, the disclosed embodiments may relate to a method of appraising resistivity inversion performance in geo-steering. The method may comprise, among other things, acquiring data representing formation resistivity along a portion of a well path and performing an inversion process using the data and a model that is derived from the data. The method may further comprise performing an eigenvalue decomposition on the data and the model and performing an analysis of the inversion process using a result of the eigenvalue decomposition. At least one inversion quality indicator may then be provided for the inversion process based on the analysis.

In general, in yet another aspect, the disclosed embodiments may relate to a computer-readable medium storing computer-readable instructions for appraising resistivity inversion performance in geo-steering. The computer-readable instructions may cause a computing system to, among other things, acquire data representing formation resistivity along a portion of a well path and perform an inversion process using the data and a model that is derived from the data. The computer-readable instructions may further cause the computing system to perform an eigenvalue decomposition on the data and the model and perform an analysis of the inversion process using a result of the eigenvalue decomposition. At least one inversion quality indicator may then be provided for the inversion process based on the analysis.

In one or more of the foregoing embodiments, the at least one inversion quality indicator includes a signal-to-noise ratio, such signal-to-noise representing a weighted or unweighted ratio of variations in data predicted by the model to variations in misfit for the inversion process. In one or more of the foregoing embodiments, the at least one inversion quality indicator includes data importance, such data importance representing damped or undamped norms of data eigenvectors for the inversion process. In one or more of the foregoing embodiments, the at least one inversion quality indicator includes model parameter importance, such model parameter importance representing damped or undamped norms of model eigenvectors for the inversion process. In one or more of the foregoing embodiments, the at least one inversion quality indicator includes model parameter confidence interval, such model parameter confidence interval representing damped or undamped norms of ratios of model eigenvectors to model eigenvalues associated with parameters of the model for the inversion process.

In one or more of the foregoing embodiments, the inversion appraisal application is further operable to display the at least one inversion quality indicator as traces above the model. In one or more of the foregoing embodiments, the inversion appraisal application is further operable to display the at least one inversion quality indicator in a pop-up window over the model. In one or more of the foregoing embodiments, the pop-up window is a visualization of Jacobian matrix elements, each matrix elements indicating a quality level for the at least one inversion quality indicator. In one or more of the foregoing embodiments, the inversion appraisal application is further operable to automatically adjust the inversion process based on the at least one inversion quality indicator.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A system for appraising resistivity inversion performance in geo-steering, comprising:
    a logging tool;
    at least one sensor mounted on the logging tool and configured to measure signals along a portion of a well path, the signals representing one or more formation properties, including formation resistivity;
    a formation evaluation system coupled to acquire data from a plurality of data channels representing the signals, the formation evaluation system configured to perform an inversion process using the data and a model that is derived from the data;
    an inversion appraisal application residing in the formation evaluation system, the inversion appraisal application operable to perform an eigenvalue decomposition on the data and the model, use a result of the eigenvalue decomposition to perform an analysis of the inversion process, and provide at least one inversion quality indicator for the inversion process based on the analysis;
    wherein the formation evaluation system is further configured to automatically select which data channels from a plurality of data channels to be used for subsequent inversions in response to the at least one inversion quality indicator exceeding an inversion quality threshold, acquire data from the selected data channels, receive an input from a user selecting certain data from the acquired data to use in subsequent inversions, and update the model using the data selected by the user to derive a final model; and
    wherein the formation evaluation system is operable to apply the final model to determine an optimal drilling parameter for the geo-steering.

2. The system of claim 1, wherein the at least one inversion quality indicator includes a signal-to-noise ratio, said signal-to-noise representing a weighted or unweighted ratio of variations in data predicted by the model to variations in misfit for the inversion process.

3. The system of claim 1, wherein the at least one inversion quality indicator includes data importance, said data importance representing damped or undamped norms of data eigenvectors for the inversion process.

4. The system of claim 1, wherein the at least one inversion quality indicator includes model parameter importance, said model parameter importance representing damped or undamped norms of model eigenvectors for the inversion process.

5. The system of claim 1, wherein the at least one inversion quality indicator includes model parameter confidence interval, said model parameter confidence interval representing damped or undamped norms of ratios of model eigenvectors to model eigenvalues associated with parameters of the model for the inversion process.

6. The system of claim 1, wherein the inversion appraisal application is further operable to display the at least one inversion quality indicator as traces above the model or in a pop-up window over the model.

7. The system of claim 6, wherein the pop-up window is a visualization of Jacobian matrix elements, each matrix elements indicating a quality level for the at least one inversion quality indicator.

8. The system of claim 1, wherein the inversion appraisal application is further operable to automatically adjust the inversion process based on the at least one inversion quality indicator.

9. A method of appraising resistivity inversion performance in geo-steering, comprising:
    acquiring data from a plurality of data channels representing formation resistivity along a portion of a well path;
    performing an inversion process using the data and a model that is derived from the data;
    performing an eigenvalue decomposition on the data and the model;
    performing an analysis of the inversion process using a result of the eigenvalue decomposition;
    providing at least one inversion quality indicator for the inversion process based on the analysis;
    automatically selecting which data channels from the plurality of data channels to be used for subsequent inversions in response to the at least one inversion quality indicator exceeding an inversion quality threshold;
    acquiring data from the selected data channels;
    receiving an input from a user selecting certain data from the acquired data to use in subsequent inversions;
    updating the model using the data selected by the user to derive a final model; and
    applying the final model to determine an optimal drilling parameter for the geo-steering.

10. The method of claim 9, wherein the at least one inversion quality indicator includes a signal-to-noise ratio, said signal-to-noise representing a weighted or unweighted ratio of variations in data predicted by the model to variations in misfit for the inversion process.

11. The method of claim 9, wherein the at least one inversion quality indicator includes data importance, said data importance representing damped or undamped norms of data eigenvectors for the inversion process.

12. The method of claim 9, wherein the at least one inversion quality indicator includes model parameter importance, said model parameter importance representing damped or undamped norms of model eigenvectors for the inversion process.

13. The method of claim 9, wherein the at least one inversion quality indicator includes model parameter confidence interval, said model parameter confidence interval representing damped or undamped norms of ratios of model eigenvectors to model eigenvalues associated with parameters of the model for the inversion process.

14. The method of claim 9, further comprising displaying the at least one inversion quality indicator as traces above the model or in a pop-up window over the model.

15. The method of claim 14, wherein the pop-up window is in the form of a matrix containing a plurality of cells, each cell indicating a quality level for the at least one inversion quality indicator.

16. The method of claim 9, further comprising automatically adjusting the inversion process based on the at least one inversion quality indicator.

17. A computer-readable medium storing computer-readable instructions for appraising resistivity inversion performance in geo-steering, the computer-readable instructions causing a computing system to:
   acquire data from a plurality of data channels representing formation resistivity along a portion of a well path;
   perform an inversion process using the data and a model that is derived from the data;
   perform an eigenvalue decomposition on the data and the model;
   perform an analysis of the inversion process using a result of the eigenvalue decomposition;
   provide at least one inversion quality indicator for the inversion process based on the analysis;
   automatically select which data channels from the plurality of data channels to be used for subsequent inversions in response to the at least one inversion quality indicator exceeding an inversion quality threshold; and
   acquire data from the selected data channels;
   receive an input from a user selecting certain data from the acquired data to use in subsequent inversions;
   update the model using the data selected by the user to derive a final model; and
   applying the final model to determine an optimal drilling parameter for the geo-steering.

18. The computer-readable medium of claim 17, wherein the at least one inversion quality indicator includes signal-to-noise ratio, noise-to-signal ratio, data importance, model parameter importance, and model parameter confidence interval for the inversion process.

19. The computer-readable medium of claim 17, further comprising computer-readable instructions for causing the computing system to display the at least one inversion quality indicator as traces above the model or in a pop-up window over a model, wherein the pop-up window is in the form of a matrix containing a plurality of cells, each cell indicating a quality level for the at least one inversion quality indicator.

20. The computer-readable medium of claim 17, further comprising computer readable instructions for causing the computing system to automatically adjust the inversion process based on the at least one inversion quality indicator.

* * * * *